Figures 4, 5:
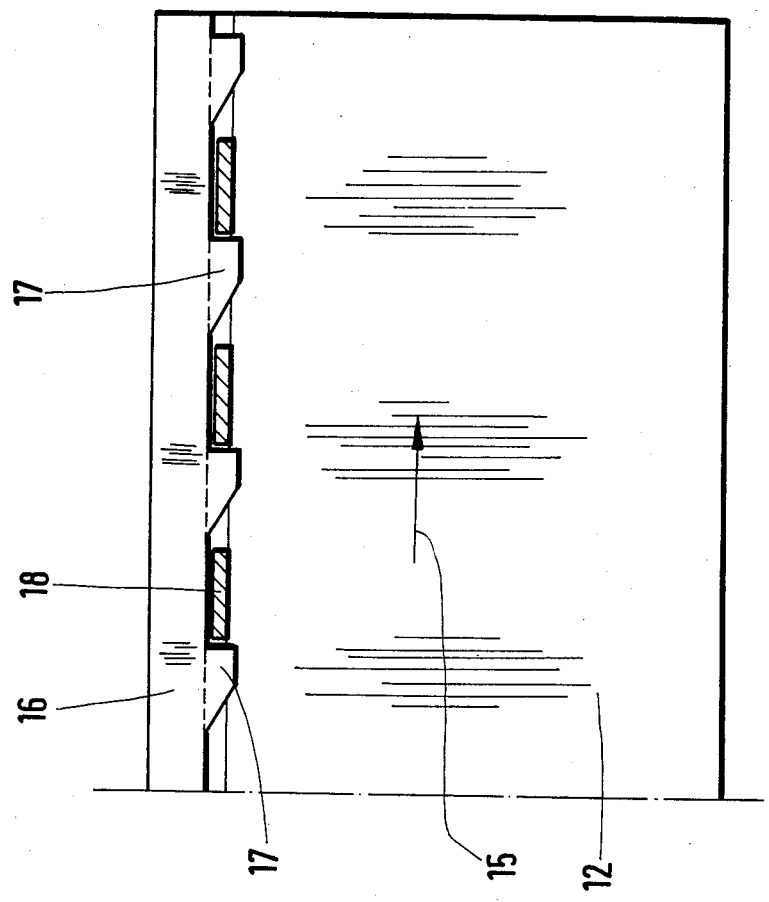

United States Patent [19]

Reil

[11] Patent Number: 4,721,242

[45] Date of Patent: Jan. 26, 1988

[54] PACK FOR LIQUIDS HAVING EDGE PROTECTION, PROCESS FOR THE PRODUCTION THEREOF AND APPARATUS FOR CARRYING OUT THE PROCESS

[75] Inventor: Wilhelm Reil, Bensheim, Fed. Rep. of Germany

[73] Assignee: Tetra Pak Finance & Trading S.A., Pully, Fed. Rep. of Germany

[21] Appl. No.: 866,883

[22] Filed: May 23, 1986

[30] Foreign Application Priority Data

Jun. 4, 1985 [DE] Fed. Rep. of Germany ....... 3519955

[51] Int. Cl.⁴ ............................................. B65D 5/42
[52] U.S. Cl. ................................. 229/48 R; 229/48 T; 229/48 SA
[58] Field of Search ............ 229/17 R, 3.1, 5.5, 229/48 R, 48 SA, 48 SB, 48 SC, 48 T; 220/75; 493/121, 129, 133

[56] References Cited

U.S. PATENT DOCUMENTS

| | | | |
|---|---|---|---|
| 3,032,251 | 5/1962 | Jarund | 229/48 T |
| 4,267,957 | 5/1981 | Holmström | 229/17 R |
| 4,327,833 | 5/1982 | Kuchenbecker | 229/17 R |
| 4,331,288 | 5/1982 | Löthman | 229/17 R |
| 4,572,426 | 2/1986 | Lisiecki | 229/48 SA |

*Primary Examiner*—Willis Little
*Attorney, Agent, or Firm*—Paul and Paul

[57] ABSTRACT

Described is a pack for liquids which at least partially comprises walls of plastics-coated paper, in particular side walls of a tubular configuration having a longitudinal sealing seam and a bottom having a transverse sealing seam, wherein the longitudinal sealing seam extends within overlapping edge portions (4, 5) and the cut edge (11) of the edge (5) which is in the interior of the pack is covered by a plastics strip (7) as edge protection.

In order, in spite of overlapping edge portions, (4, 5), to ensure that the pack is satisfactorily liquid-tight, with the capacity to carry tensile forces, with at the same time the edge protection effect, it is provided in accordance with the invention for the pack that the plastics strip (7) as the edge protection means is laid over in a U-shaped configuration in cross-section around the cut edge (11) of the inner edge portion (5) and is sealed (at 30) onto both surfaces of the edge portion (5).

9 Claims, 10 Drawing Figures

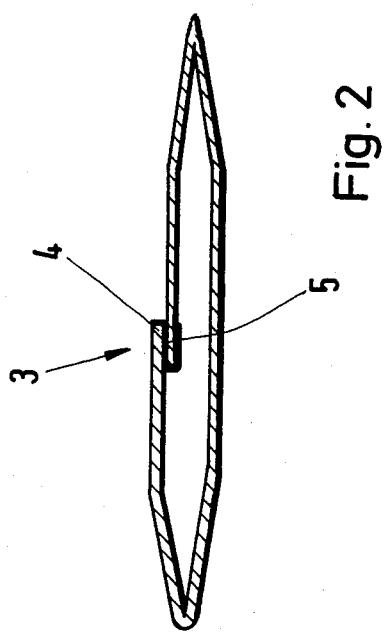
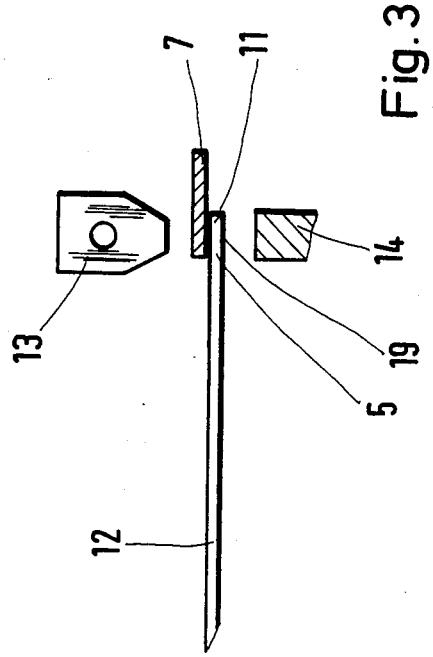
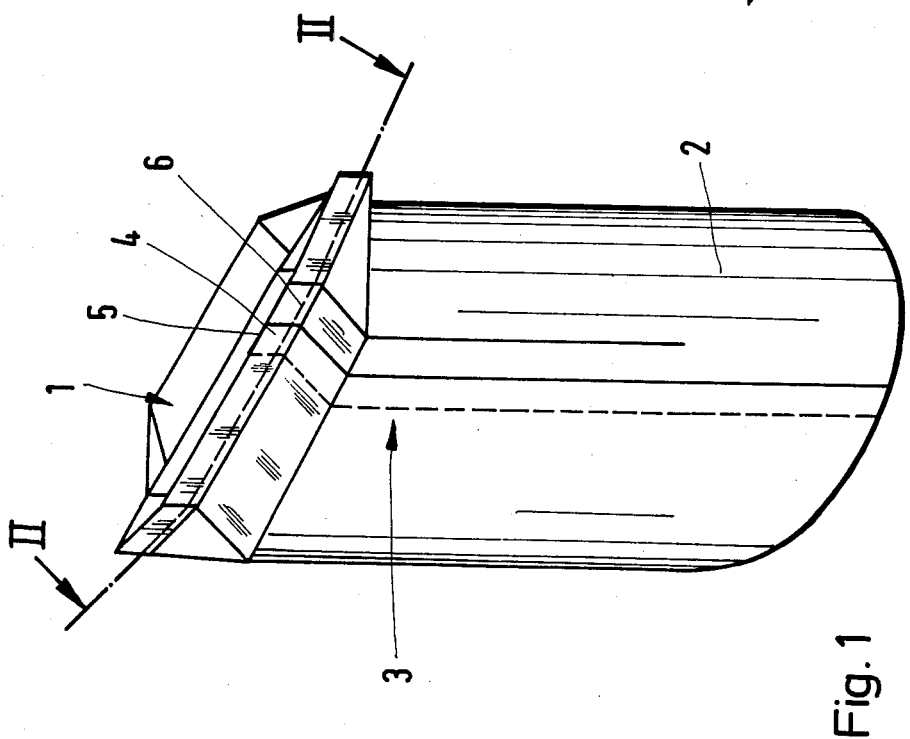

PACK FOR LIQUIDS HAVING EDGE PROTECTION, PROCESS FOR THE PRODUCTION THEREOF AND APPARATUS FOR CARRYING OUT THE PROCESS

The invention relates to a pack for liquids, which at least partially comprises walls of a carrier material, for example paper, which is coated at least on one side with plastics material, in particular side walls of a tubular configuration, having a longitudinal sealing seam, and a bottom having a transverse sealing seam, wherein the longitudinal sealing seam extends within overlapping edge portions and the cut edge of the edge portion which is in the interior of the pack is covered by a plastics strip as edge protection.

A very wide range of types of packs are known for the packaging of liquids, for example milk, fruit juices and the like. There are one-trip packs which at least partially comprise paper coated on both sides with plastics material.

There are parallelepipedic milk packs whose side walls, bottom and cover or lid only consist of coated paper. However in recent times there are also liquid packs in which the side walls and the bottom comprise coated paper while the cover or lid is formed from pure thermoplastic material. The invention relates to packs of both general kinds, in which in particular the side walls are formed from a tube or tubular configuration by virtue of the web of paper, which is initially in a flat-lying condition, being formed into a tubular configuration, and the edge portions being joined together in mutually overlapping relationship. In that case the longitudinal sealing seam of the tubular body of the pack extends within the overlapping edge portions and fluid-tightly joins them together.

It is known that the cut edge portions of a web of material form a cut edge which is not coated with plastics material but which has an edge surface that exposes the pores in an outward direction. Liquid can penetrate into an open edge of that nature, cause the carrier or backing material such as paper to swell up, and damage the pack.

To avoid that phenomenon, the edge portions of the web have already been joined together in another configuration, by folding up the edge portions and gluing or sealing them together. In that case, in the finished pack, the free cut edges which are the area at risk are both disposed outwardly while the liquid within the pack cannot reach the cut edges and therefore cannot put them at risk. However due to the material filling the pack, the pack is subjected to tensile forces which, when the pack has a longitudinal sealing seam which is produced in the manner just described above, can cause damage by the sealing seam being torn open.

The tensile forces are better carried by overlapping edge portions. In order to cover over the cut edge, it is already known for a plastics strip to be sealed in position thereon, to act as edge protection. For that purpose, a plastics strip is about halfway sealed in position on a surface of the web along an edge portion thereof. Thereafter the web which is initially in a lying-flat condition is formed into a tubular configuration in such a way that the plastics strip comes to lie in the interior of the tubular configuration. The overlapping edge portions are joined together, when producing the longitudinal sealing seam of the tubular configuration, in such a way that the underneath surface of the one edge portion is applied to and sealed onto the surface of the oppositely disposed edge portion of the tubular configuration. At the same time as the longitudinal sealing seam is produced, the plastics strip which has been half sealed in position on the web of material is sealed in position on the inside surface of that portion of the web of material that forms the outwardly overlapping edge portion. The cut edge is liquid-tightly covered over by the sealing seam with which the plastics strip is sealed on the above-mentioned inside surface of the outwardly overlapping edge portion.

That known process suffers from the disadvantage that, when the longitudinal sealing seam is formed, a region which has three layers of paper is disposed directly beside a region which has only two layers of paper, while sealing seams are to be produced on both sides of the cut edge. That consideration gives rise to difficulties in the sealing operation and thus also in regard to making the pack liquid-tight. On the one hand, the attempt has been made to compensate for the different wall thicknesses (two layers/three layers) by virtue of the provision of strip-like raised portions on the sealing jaws. It will be appreciated that production with and the operation of tools of that kind is complicated and expensive. In addition, it was found that there was the further disadvantage that the flow of heat from the hot sealing jaw does not take place in the desired manner uniformly to the location to be heated, so that problems in regard to making the pack liquid-tight were incurred. That was further worsened by virtue of the fact that there is not sufficient plastics material at the critical location along the cut edge in order on the one hand to produce a good liquid-tight seal and on the other hand to ensure that the tensile forces can be adequately carried. A further disadvantage was also noted, namely that the depth of penetration of the heat from the hot sealing jaw cannot always be achieved in precisely defined manner, as is required. As it is not readily possible to use an internal mandrel when producing the longitudinal sealing seam and when sealing the plastics strip in position to provide the edge protection effect, the welding operation is effected with the tubular portion in a laid-flat condition. After the longitudinal sealing seam has been produced however it must be possible for the tube portion to be opened out again so that the pack can be filled. It is therefore necessary to ensure that the heating and thus the softening of the plastics materials do not reach the oppositely disposed continuous side wall. In order to meet that requirement, compromises have frequently been sought in regard to making the pack liquid-tight and producing a good weld at the longitudinal sealing seam. It has not been possible to find a satisifactory solution.

The butt-welded seam or even the longitudinal sealing seam with peeled-off overlapping edge portions has not afforded the desired level of simplification and reliability.

The object of the present invention is therefore that of providing a pack for liquids of the kind set forth in the opening part of this specification, in which, in spite of overlapping edge portions, satisfactory liquid-tightness is ensured, with the possibility of suitably carrying the tensile forces, with simultaneous edge protection; and also to provide a process for the production of such a pack and an apparatus for carrying out that process.

According to the invention that object is attained in that the plastics strip as the edge protection is laid in a U-shape in cross-section around the cut edge of the inner edge portion and is sealed onto both surfaces of the edge portion. The features according to the invention constitute a further development in the procedure which is already available, whereby the plastics strip is partially sealed lengthwise onto the edge portion of the web which is lying flat, provision additionally being made for laying over and sealing the plastics strip in position also from the opposite side. That gives a satisfactory edge protection effect and in particular with the same consumption of material gives a larger amount of plastics material at the critical locations of edge overlapping with the longitudinal sealing seam. Apart from the improved possibilities in regard to sealing the pack, the features in accordance with the invention provide for better welding and improved liquid-tightness when melting the plastics material and causing it to flow at the critical locations. The arrangement of the invention also provides a higher level of resistance to the tensile forces which act in the filled pack.

In accordance with the invention the pack is of a particular advantageous configuration when a hollow space is provided between the cut edge and the plastics strip which is laid in a U-shaped configuration therearound. That preferred construction gives two main advantages. More or less sharp edges are virtually always produced at the edge portions of the cut. If now a plastics strip is laid around those edges in a very severe or tightly fitting fashion, the plastics strip could be damaged and thus give rise to leakage. If on the other hand in accordance with the invention a hollow space is left along and in front of the entire cut edge, then the sharp edges at the sides of the cut edge do not afford any possibility of causing damage to the plastics strip. The second advantage is concerned with the liquid-tightness and increased resistance to tensile forces, as already referred to above, by virtue of feeding the desired plastics material at the critical location when welding the sealing seam by overlapping of the edge portions. More specifically, the above-mentioned critical location is generally a few millimeters (for example 1 to 4 mm) away from the cut edge which is to be protected. However, by virtue of the above-mentioned hollow space between the cut edge and the plastics strip, the latter is shifted more towards that critical location.

In another advantageous aspect of the invention, the process for the production of the pack wherein the plastics strip is sealed in the longitudinal direction onto the forwardly moving web which is lying in a flat condition, partially overlapping the edge portion thereof, is characterised in that the portion of the plastics strip which projects beyond the cut edge is laid over in a U-shaped configuration in cross-section and is sealed on the underside of the edge portion. The operation of initially partially sealing the plastics strip onto the forwardly moving web in a lying-flat condition is already known and is the subject of further development insofar as, in the production process, the plastics strip which is thus partially sealed in position is now laid around the cut edge which is the location that is at risk, and is also sealed in position on the underside of the edge portion for fixing it in that edge-protection configuration. This arrangement also provides the accumulation of plastics material at the region of the longitudinal sealing seam, thereby affording more capacity for carrying high tensile forces in the pack when filled, in respect of the finished longitudinal sealing seam.

In accordance with the invention it is particularly advantageous if the projecting portion of the plastics strip is sealed spotwise onto the edge portion in the cycle of movement of the web, thereafter the web is formed into a tubular configuration and then the entire surface of the laid-over plastics strip is sealed to the two edge portions which are laid in overlapping relationship. In accordance with the invention the fact that the plastics strip is sealed in position in a spotwise manner gives the advantage that provided between the sealing surfaces are areas or regions for further operation of tools on the edge portion with the plastics strip. For example sealing means may operate between folding means, and vice-versa. It will be appreciated that the operation of sealing the plastics strip in position in a spotwise manner is not sufficient, as however the longitudinal sealing seam is in any case produced with the web of material in a tubular configuration, that sealing operation can also be used at the same time for the step of completely and liquid-tightly sealing the laid-over plastics strip in place.

That sealing procedure, partially in a spotwise manner and then continuously over the entire height of the pack, for example, produces an advantageous flow of the plastics material which can then flow into the critical passages or ducts and there ensure that the pack is sealed in a liquid-tight manner and a strong join is produced.

Another advantage of initially sealing the plastics strip in a spotwise manner onto the underside of the edge portion and then sealing the assembly over the entire surface thereof is that pre-treatment of the plastics strip has already occurred and the action of the heat of the sealing jaw on that location at which the plastics material forms the particularly important sealing seams is facilitated and made more precise. By virtue of the heat which acts on the material and which is introduced from the hot sealing jaw being advantageously controlled in that way, it is possible advantageously to ensure that no welding occurs on the opposite side of the tubular portion of the web of material, which is laid together in a flat condition, so that after the operation of producing the finished longitudinal sealing seam with the advantages according to the invention, the tubular portion can be readily opened for the purposes of filling the pack and finishing it off.

By virtue of the novel longitudinal sealing seam with the substantial amount of plastics material in the overlap area and beside the liquid-tight sealing seam, in another advantageous step, the transverse sealing operation can be carried out in per se known manner by oppositely disposed sealing jaws without the point of intersection between the longitudinal and transverse sealing seams becoming a critical one.

In regard to the apparatus for carrying out the process, in which sealing jaws and co-operating jaws are provided for partially sealing the plastics strip onto the top side of the edge portion, the above-specified object is achieved in accordance with the invention in that disposed in the direction of conveying movement of the web and laterally beside the path of conveying movement thereof are an elongate slide shoe and sealing means for attaching the plastics strip to the underside of the edge portion, and disposed thereafter folding and sealing means for the longitudinal sealing seam. It has already been mentioned that sealing means for sealing the plastics strip onto the top side of the edge portion of the web of material are known. Now, in accordance with the invention, an elongate slide shoe is disposed laterally beside the path of conveying movement of the web, in the direction of conveying movement thereof. The slide shoe causes the plastics strip to be laid over in a U-shape in cross-section in such a way that the originally free cut edge is now completely covered over by and protected by ample plastics material (edge protection effect). The slide shoe provides for the operation of folding over the plastics strip, and the arrangement includes sealing means for attaching the strip to the underside of the edge portion. Furthermore, disposed downstream thereof in the direction of conveying movement of the web are the folding and sealing means for the longitudinal sealing seam.

In operation of the apparatus according to the invention it has been found to be particularly advantageous if, in accordance with the invention, the elongate slide shoe is of a U-shaped configuration in cross-section and has a row of laying-over fingers which stand out substantially transversely with respect to the direction of conveying movement of the web, and if a sealing means is disposed between each two laying-over fingers for the purposes of attaching the plastics strip. The slide shoe initially moves the plastics strip out of the plane of the web of material, with the web of material still lying in a flat condition, in a U-shaped configuration, and holds the plastics strip which has not yet been sealed in position, in that form. The laying-over fingers leave, between each two adjacent fingers, regions into which sealing jaws can engage, to attach the plastics strip to the underside of the edge portion. Although the sealing surface of the plastics strip on the underside of the edge portion is initially only of a spot configuration, the web can now however be handled in any manner without the slide shoe, for example it can be folded into a tubular configuration and passed between the sealing jaws for the longitudinal sealing seam. The plastics strip is now also sealed in position over its entire surface, at the same time as the longitudinal sealing seam is produced.

Because the longitudinal sealing seam is produced only at locations where there are three layers of paper in superposed relationship, the sealing jaws do not need to have any humps, protruberances, raised strip portions or the like. The only surface that is involved is the surface of the three superposed layers of paper so that the sealing jaw and the (generally cold) co-operating jaw may have a flat surface. The plastics material, generally polyethylene, runs due to the inflow of heat from the hot sealing jaw, and produces the longitudinal sealing seam between the upper and lower edge portions, which are the uppermost and middle layers of paper. There is no sealing effect as between the middle and lower layers of paper. The heat does not reach that location, or the short period of time involved is in no way sufficient to make a welded join. In that way the tubular portion can be readily opened after the longitudinal sealing operation, for the purposes of filling it.

Figure 6:
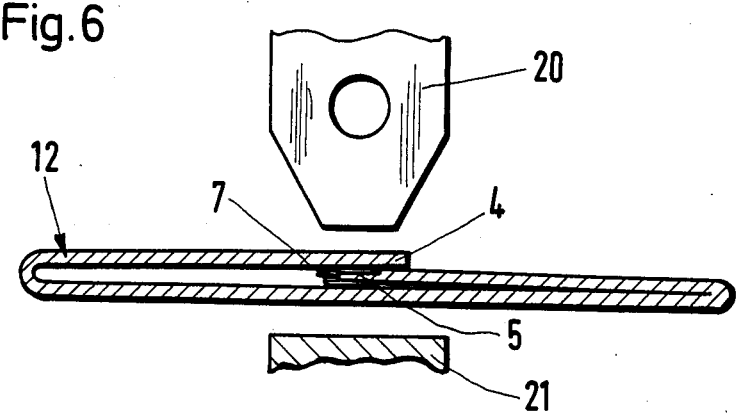
Figure 7:
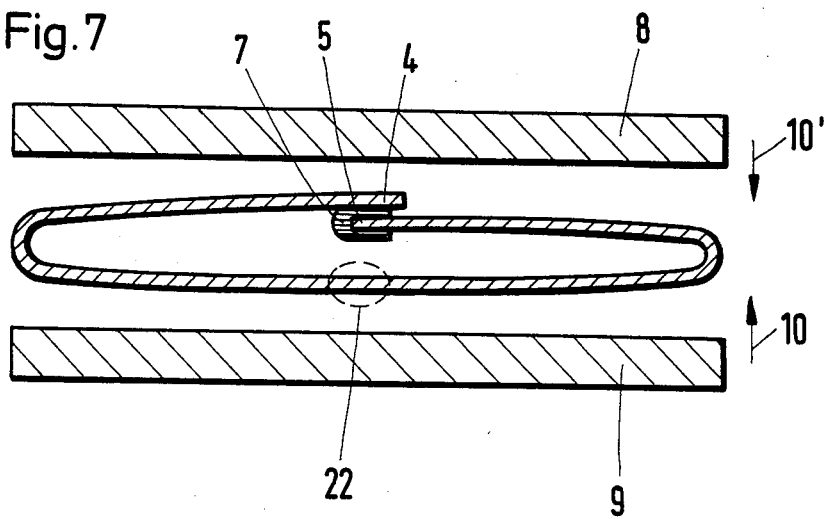
Figure 8:
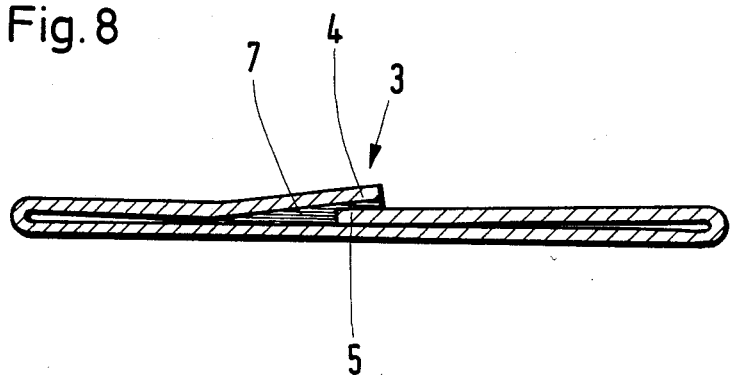
Figure 9:
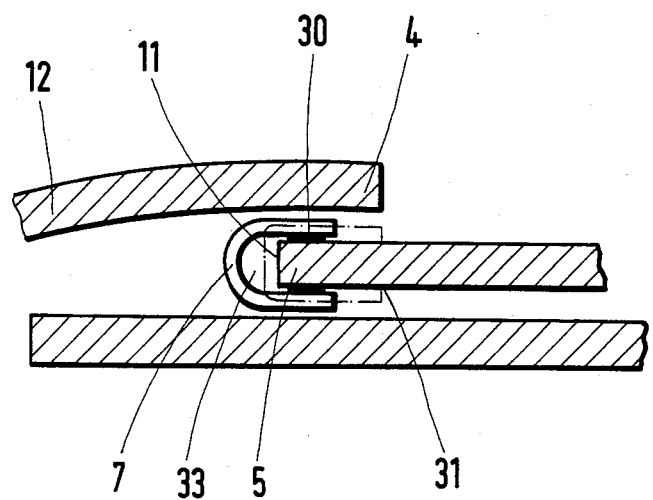
Figure 10:
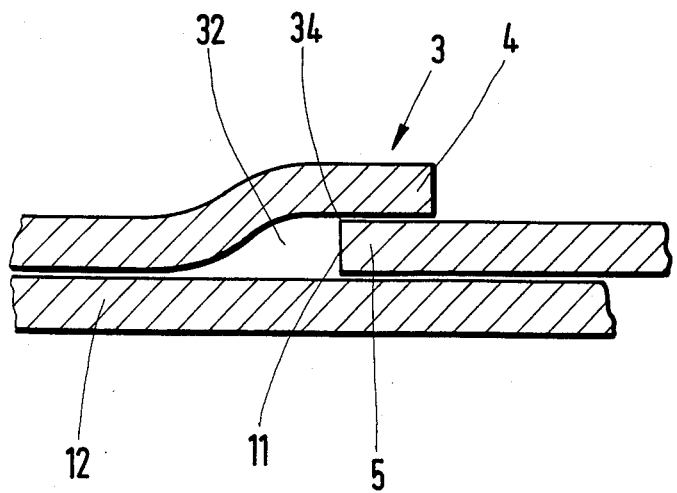

Further advantages, features and possible uses of the present invention will be apparent from the following description of a preferred embodiment with reference to the accompanying drawings in which:

FIG. 1 is a perspective view of a partially closed pack whose side walls and bottom comprise plastics-coated paper, FIG. 2 is a view in section taken along line II—II in FIG. 1, FIG. 3 is a diagrammatic, broken-away view of the web of paper in the opposite direction to the direction of conveying movement with the plastics strip which is sealed in position on the edge portion by the sealing means, FIG. 4 is a diagrammatic side view of the web of paper in the diretion of conveying movement which extends laterally in the slide shoe, FIG. 5 is a plan view of FIG. 4 viewing from the right towards the left, FIG. 6 is a diagrammatic, broken-away view of the web of paper which is brought together to form the tubular portion, with the plastics strip which is attached in a U-shaped configuration, for producing the longitudinal sealing seam, FIG. 7 is a diagrammatic view of the transverse sealing jaws with the tubular portion of paper disposed therebetween, with edge protection, prior to the sealing operation, FIG. 8 is a view in cross-section of the compressed paper tube after the longitudinal sealing seam has been produced, FIG. 9 is a diagrammatic, broken-away view on an enlarged scale and in section at the location of the overlapping edge portions with plastics strip laid thereon, and FIG. 10 is also a broken-away, diagrammatic sectional view on an enlarged scale, similarly to the middle region in FIG. 8, with the regions filled with plastics material being shown of course in an empty condition in this case, in order better to show the relationship of the respective reference numerals.

FIG. 1 shows the liquid pack after the filling operation and just before the operation of closing a bottom wall portion which is generally denoted by reference numeral 1, the side walls 2 and the bottom wall portion of the pack illustrated comprising paper coated on both sides with polyethylene. The longitudinal sealing seam which is generally denoted by reference numeral 3 is formed by two mutually overlapping edge portions 4 and 5, reference numeral 4 denoting the upper outer edge portion and reference numeral 5 denoting the lower inner edge portion.

After the transverse sealing operation, the transverse sealing seam extends approximately along the broken line indicated at 6 in FIG. 1.

FIG. 2 shows a view in section taken along line II—II in FIG. 1, that is to say, through that line which later becomes the transverse sealing seam. In FIG. 2 initially only the longitudinal sealing seam 3 has been produced, that seam being shown on a larger scale and in greater detail in the cross-sectional view in FIG. 8. The black area is the plastics material that has run, of the plastics strip 7 which, prior to the material running, is shown in the condition illustrated in FIG. 7. In addition, FIG. 7 shows the condition prior to the operation of forming the transverse sealing seam 6, that is to say before the sealing jaws 8 and 9 are moved towards each other in the direction indicated by the arrows 10 and 10'.

The edge protection effect is produced in the finished condition by the plastics strip 7 which is laid in a U-shaped configuration around the free cut edge 11. That edge protection is produced in the manner described hereinafter.

Referring to FIG. 3, initially the web 12 which is coated with plastics material on both sides is conveyed with a cyclic movement in the opposite direction to the direction of view of the person looking at the drawing, in such a way that the edge portion 5 comes to lie below the sealing jaw 13 and above the co-operating jaw 14 while the plastics strip 7 is about half way laid onto the edge portion 5. The operation of sealing the plastics strip 7 in position is then effected in per se known manner. In the finished condition, it projects with a portion beyond the cut edge 11 which is still open (transversely with respect to the direction of conveying movement 15).

Referring to FIG. 5, the web 12 of paper is conveyed in the direction indicated by the arrow 15, that is to say in the direction of view of the person looking at the drawing in FIG. 4.

The edge portion 5 of the web 12, which is at the top in FIGS. 5 and 6, is guided into a slide shoe 16 which has a row of laying-over fingers 17 which stand out transversely with respect to the direction of conveying movement of the web 12, as indicated at 15. Disposed between each two fingers 17 is a respective sealing area at 18 in which the sealing means (not shown) can operate and are provided for spotwise attachment of the plastics strip 7 to the underside 19 (see FIG. 3) of the edge portion 5.

The condition shown in FIG. 7 has now been reached, in which the plastics strip 7 is laid around the edge portion 5 in a U-shaped configuration in such a way that the free cut edge 11 is completely covered and protected by plastics material.

To form the longitudinal sealing seam, the tubular portion of the web 12 is passed between the sealing jaws 20 and 21, as shown in FIG. 6. The upper overlapping edge portion 4 is completely welded onto the lower edge portion 5 with the plastics strip 7 which now is only spotwise attached at the top (between the edge portions 4 and 5). The material runs in the molten condition as shown in FIG. 8, without a sealing effect being produced in the lower region 22 in FIG. 7 so that the tube portion can be easily opened at a later time for the purposes of filling it.

FIG. 9 is a view on an enlarged scale of the other embodiment in which, although the plastics strip 7 is also laid in a U-shaped configuration around the free cut edge 11, a hollow space or cavity 33 is provided between the cut edge 11 and the strip 7. For the sake of improved comparison, the position of the plastics strip in accordance with the embodiment first described above is shown in broken lines, with the outer edges extending further towards the right as indicated by way of example by reference numeral 31. Reference numeral 30 shows the respective sealing seam between the surface of the edge portion 5 and the plastics strip 7. If the hollow space 33 is left, then the free edges of the plastics strip 7 can no longer extend as far as the location indicated at 31 but are further towards the left in the view shown in FIG. 9. Thus the entire plastics strip 7 is shifted further towards the left.

It is approximately at the location 32 that occurs the critical location in regard to liquid-tightness of the pack and the aspect of carrying the tensile forces, as shown in FIG. 10. However it is precisely at that point that, due to the plastics strip 7 with the hollow space 33, there is adequate plastics material to provide a strong and satisfactory weld.

In FIG. 10, a corner of the cut edge 11 is also indicated at 34. That is the sharp edge which extends along the entire cut edge 11 and which obviously is also to be found at the bottom, on the opposite side, namely at both ends of the cut edge 11. Those sharp edges are further away from the plastics strip, when the hollow space 33 is provided, as shown in solid lines in FIG. 9, than when there is no hollow space, as shown in broken lines in FIG. 9. The man skilled in the art will immediately realize that, in the case of the embodiment with the hollow cavity 33, the danger of damage to the plastics strip 7 is considerably reduced, if not entirely eliminated.

As shown in FIG. 9, the hollow space may be of a width of from 0.5 mm to 2 mm, preferably 1 mm, between the cut edge 11 at the right-hand end and the inner surface of the plastics strip 7 at the left-hand end of the hollow space 33.

I claim:

1. A pack for liquids, the pack comprising a plastics strip and walls formed from a carrier material coated on at least one side with plastics material,
   the pack having side walls of a tubular configuration, a longitudinal sealing seam, and a bottom having a transverse sealing seam,
   the longitudinal sealing seam including overlapping interior and exterior edge portions of the side walls, the interior edge portion having a cut edge and interior and exterior surfaces, the plastics strip being laid in a cross-sectional U-shape around the interior edge portion, and the plastics strip being sealed onto both the interior and exterior surfaces of said interior edge portion.

2. A pack according to claim 1 including a hollow space between the cut edge of the interior edge portion and the plastics strip.

3. A process for the production of a pack for liquids, the pack comprising a plastics strip and walls formed from a carrier material coated on at least one side with plastics material,
   the pack having side walls of a tubular configuration, a longitudinal sealing seam, and a bottom having a transverse sealing seam,
   the longitudinal sealing seam of the pack including over-lapping interior and exterior edge portions of the side walls, the interior edge portion having a cut edge and interior and exterior surfaces, the plastics strip being laid in a cross-sectional U-shape around the interior edge portion, and the plastics strip being sealed onto both interior and exterior surfaces of said interior edge,
   wherein the process comprises sealing the plastics strip in a longitudinal direction onto one surface of the edge portion of a forwardly moving web of carrier material, the web being in a flat condition, the plastics strip partially overlapping one surface of the interior edge portion of the web,
   laying the portion of the plastics strip projecting beyond the cut edge over in a U-shaped cross-section configuration,
   and sealing the portion of the plastics so laid over onto the opposite surface of the interior edge portion.

4. A process according to claim 3 wherein the laying over and sealing of the plastics strip in a U-shaped configuration provides a hollow space between the cut edge and the plastics strip.

5. A process according to claim 3 wherein the projecting portion of the plastics strip is sealed spotwise onto the edge portion in the cycle of movement of the web, and further including forming the web into a tubular configuration including two overlapping edge portions, and then sealing the entire surface of the laid-over plastics strip to the two overlapping edge portions.

6. Apparatus for manufacturing a pack for liquids, wherein the pack comprises a plastics strip and walls of a carrier material coated on at least one side with plastics material, the pack having side walls of a tubular configuration, a longitudinal sealing seam, and a bottom having a transverse sealing seam, the longitudinal sealing seam of the pack including overlapping interior and exterior edge portions of the side walls, the interior edge portion having a cut edge and interior and exterior surfaces, the plastics strip being laid in a cross-sectional U-shape around the interior edge portion, and the plastics strip being sealed onto both the interior and exterior surfaces of the interior edge portion;

the apparatus comprising:

sealing and cooperating jaws for partially sealing the plastics strip onto one surface of the interior edge portion, an elongated slide shoe and sealing means for attaching the plastics strip to the opposite surface of the interior edge portion, the slide shoe and sealing means being laterally disposed in the direction of conveying movement of the web and beside the path of conveying movement thereof, and folding and sealing means for the longitudinal sealing seam further laterally disposed in the direction of conveying movement of the web.

7. An apparatus according to claim 6 wherein the elongated slide shoe has a U-shaped configuration in cross section and a row of laying-over fingers which stand out substantially transversely with respect to the direction of conveying movement of the web, a respective sealing means being arranged between each two laying-over fingers for attaching the plastics strip.

8. A pack for liquids, the pack comprising a plastics strip and walls of a carrier material, the pack having at least one longitudinal sealing seam including overlapping interior and exterior edge portions of the carrier material, the interior edge portion having a cut edge and interior and exterior surfaces, the plastics strip being laid in a cross-sectional U-shape around the interior edge portion, and the plastics strip being sealed onto both interior and exterior surfaces of the interior edge portion.

9. A pack according to claim 8 including a hollow space between the cut edge of said interior edge portion and of the plastics strip.

* * * * *